(12) United States Patent
Taulbee et al.

(10) Patent No.: US 7,308,463 B2
(45) Date of Patent: Dec. 11, 2007

(54) PROVIDING REQUESTED FILE MAPPING INFORMATION FOR A FILE ON A STORAGE DEVICE

(75) Inventors: Bradley Taulbee, Fort Collins, CO (US); Scott Spivak, Fort Collins, CO (US); Michael Fleischmann, Fort Collins, CO (US); Gary Cain, Fort Collins, CO (US); Kevin Collims, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 10/180,284

(22) Filed: Jun. 26, 2002

(65) Prior Publication Data

US 2004/0002934 A1  Jan. 1, 2004

(51) Int. Cl.
  *G06F 17/00* (2006.01)
(52) U.S. Cl. .................. 707/104.1; 707/6; 707/10; 707/101; 707/102; 707/103 Y; 707/205
(58) Field of Classification Search ............... 709/230; 707/6, 10, 101, 102, 103 Y, 104.1, 205; 717/4, 717/113, 165
See application file for complete search history.

(56) References Cited

U.S. PATENT DOCUMENTS

| | | | | |
|---|---|---|---|---|
| 5,218,697 A | * | 6/1993 | Chung | 709/230 |
| 5,692,177 A | * | 11/1997 | Miller | 707/8 |
| 5,832,515 A | * | 11/1998 | Ledain et al. | 707/202 |
| 6,021,408 A | * | 2/2000 | Ledain et al. | 707/8 |
| 6,282,602 B1 | * | 8/2001 | Blumenau et al. | 711/4 |
| 6,329,985 B1 | * | 12/2001 | Tamer et al. | 715/853 |
| 6,385,626 B1 | * | 5/2002 | Tamer et al. | 707/203 |
| 6,393,540 B1 | * | 5/2002 | Blumenau et al. | 711/165 |
| 6,542,909 B1 | * | 4/2003 | Tamer et al. | 707/205 |
| 6,883,063 B2 | * | 4/2005 | Blumenau et al. | 711/113 |
| 6,938,059 B2 | * | 8/2005 | Tamer et al. | 707/205 |
| 2002/0002661 A1 | * | 1/2002 | Blumenau et al. | 711/165 |
| 2003/0130986 A1 | * | 7/2003 | Tamer et al. | 707/1 |
| 2003/0182317 A1 | * | 9/2003 | Kahn et al. | 707/200 |
| 2005/0044312 A1 | * | 2/2005 | Blumenau et al. | 711/113 |

OTHER PUBLICATIONS

Richter, Jeffrey, "Advanced Windows (TM)," 1997, Microsoft Press (TM), pp. 646-651, and 745.*
"Simple Object Access Protocol (SOAP) 1.1," W3C, May 8, 2000, 34 pages.*

* cited by examiner

*Primary Examiner*—Thuy Pardo

(57) ABSTRACT

A resolve agent for providing requested file mapping information for a file on a storage device. The agent comprises an application programming interface through which file identifying information is provided to the resolve agent and the requested file mapping information provided by the resolve agent; and file system logic configured to ascertain the requested file mapping information from file data structures on the storage device according to a file system that created the file data structure on the storage device.

28 Claims, 5 Drawing Sheets

PROVIDING REQUESTED FILE MAPPING INFORMATION FOR A FILE ON A STORAGE DEVICE

BACKGROUND OF THE INVENTION

1. Field of the Invention

The present invention relates generally to computer file systems and, more particularly, to computer file systems that locate extents of a file stored on a storage device in a manner that is independent of the implemented operating system.

2. Related Art

An application server is a computer that executes application programs such as order entry systems, banking systems and employee databases. Typically, client computers or workstations, by which users interact with the application programs, are connected to the application server over a local area network (LAN), or a wide area network such as the Internet. In some cases, storage devices such as disks are directly connected to the application servers to store application programs and application data (hereinafter, collectively called "files"). These disks are referred to as local disks. In other cases, disk arrays (also commonly referred to as storage servers) are used to store the files. A disk array is a computer, separate from an application server, which is dedicated to storing files. Application servers are typically connected to disk arrays by a storage area network (SAN). Software executing in the application servers and the disk arrays make the disks of the disk arrays appear as though they are directly connected to the application servers from the perspective of the application programs.

Each application server and each disk array is under the control of an operating system, such as Windows NT, Sun Solaris or HP-UX. Each operating system stores files on disks and other storage devices using a "file system," such as the HFS file system from Hewlett-Packard Company, the NTFS file system from Microsoft, and the Sun file system from Sun Microsystems, Inc.. A file system is a set of routines that allocates space on the storage devices and keeps track of storage-related information such as where each file is stored on the storage device, the name of each file, the folder or directory structure in which each file is organized, and the owner, access rights and other attributes of each file. A file system stores this storage-related information on the storage device. This storage-related information is commonly referred to as "file data structures," "on-disk structures" and a "file structure" (collectively and generally referred to herein as a file data structure).

An operating system uses its file system to interpret this file data structure whenever an application program, or the operating system itself, reads from or writes to a file on the storage device. File systems from disparate operating systems are not compatible with each other, because file data structures created by one operating system's file system typically cannot be interpreted by another operating system's file system. Consequently, a file stored in accordance with one operating system typically cannot be read by a different operating system.

To enable recovery from catastrophic loss of data in case of hardware failure, sabotage, fire or other disaster, data centers routinely make backup copies of their files. These copies are typically made on removable media, such as magnetic tape or optical disk, and are then stored off-site.

Data centers typically back up files periodically. Oftentimes, backup operations are performed daily, although in some circumstances, backup operations are performed hourly or even continuously. Backup operations are becoming increasingly problematic due to the increase in computer resources consumed by such operations. Specifically, backup operations generate memory and computational demands on these application servers and disk arrays, reducing the computers' capability to execute application programs and/or quickly access files. Backup operations also consume network (LAN and SAN) resources; that is, they generate network traffic, which decreases the network's capacity to handle application-generated traffic between application servers and disk arrays. Furthermore, it is impractical to backup open files, because application programs that access these files are likely to change data in these files while the backup operation is in progress, rendering the backup copy internally inconsistent.

In an attempt to avoid these problems, data centers sometimes schedule backup operations for evenings, weekends, or other times that the application programs are not being utilized by many users. Oftentimes, during the backup operations, the application programs are shut down to prevent the data from being manipulated during the backup operation. However, this commonly used approach to backing up data is flawed, because it leaves the files vulnerable to data loss for long periods of time and during times of rapid change, that is, during times of peak usage. Furthermore, in some cases the time it takes to backup the files is significantly greater than the time during which the application program execution can be halted. In addition, each backup program is typically designed to run under only one operating system and can create backup copies of files stored under only that operating system, so a data center might have to employ several backup programs, one for each operating system, which increases costs to acquire the backup software and train data center personnel.

SUMMARY OF THE INVENTION

In one aspect of the invention, an agent for providing requested file mapping information for a file on a storage device. The agent comprises an application programming interface through which file identifying information is provided to the resolve agent and the requested file mapping information provided by the resolve agent; and file system logic configured to ascertain the requested file mapping information from file data structures on the storage device according to a file system that created the file data structure on the storage device.

In another aspect of the invention, a resolve agent for providing requested file mapping information is disclosed. The resolve agent comprises an application programming interface, by which file identifying information can be passed to the resolve agent and the requested file mapping information can be passed by the resolve agent. The resolve agent also comprises file system logic capable of ascertaining file mapping information according to a file system selected by a compilation parameter and capable of ascertaining the requested file mapping information from an on-disk structure according to the selected file system.

In a further aspect of the invention, a resolve agent for providing requested file mapping information is disclosed. The resolve agent comprises an application programming interface, by which file identifying information can be passed to the resolve agent and the requested file mapping information can be passed by the resolve agent. The resolve agent also comprises file system logic capable of ascertaining the requested file mapping information from an on-disk structure.

In a still further aspect of the invention, a method for providing requested file mapping information for a file on a storage device. The method comprises the steps of receiving a request for file mapping information, said request including file identifying information; obtaining the requested file mapping information from file data structures on the storage device according to a file system that created the file data structure on the storage device; and providing the requested file mapping information in reply to the request.

In yet another aspect of the invention, an article of manufacture is disclosed. The article of manufacture comprises a computer-readable medium storing computer-executable instructions, the instructions implementing an application programming interface, by which file identifying information can be received and file mapping information can be sent; and a file system capable of ascertaining the file mapping information from an on-disk structure.

In another aspect of the invention, an application programming interface (API) is disclosed. The API comprises, an input parameter comprising file identifying information; and an output parameter comprising file mapping information corresponding to the file identifying information.

In one more aspect of the invention, a resolve agent for providing requested file mapping information is disclosed. The resolve agent comprises means for passing file identifying information and the requested file mapping information; and means for ascertaining file mapping information according to a plurality o file systems and for ascertaining the requested file mapping information from file data structures according to one of the plurality of file systems.

Various embodiment of the present invention provide certain advantages and overcome certain drawbacks of the above and other conventional techniques. Not all embodiments of the present invention share the same advantages and those that do may not share them under the same or similar circumstances. Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The present invention can be better understood by referring to the following detailed description of a preferred embodiment in conjunction with the accompanying drawings, in which.

DETAILED DESCRIPTION

Figure 1:
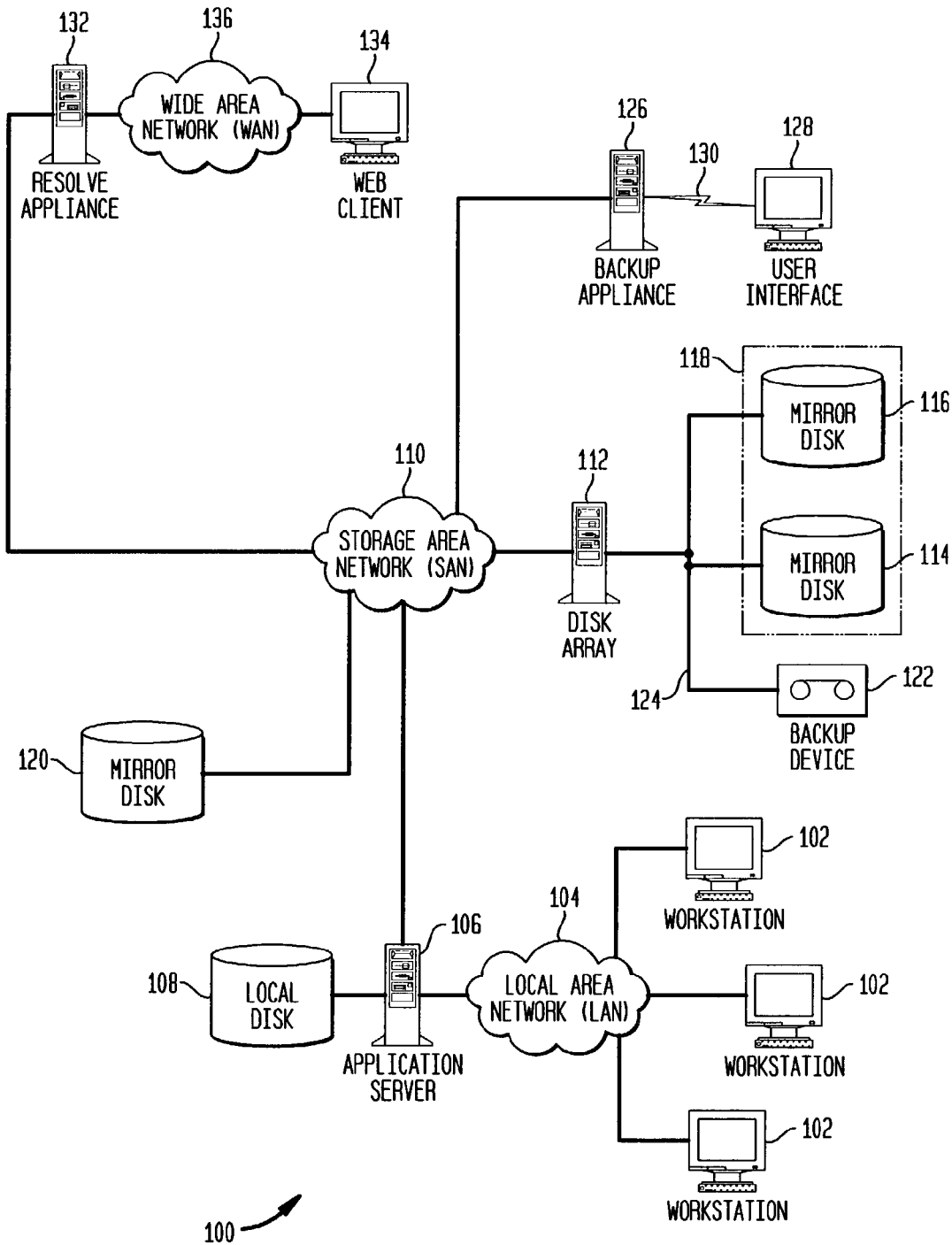
FIG. 1 is a block diagram of an exemplary computer environment, in which the present invention can be practiced.

The present invention provides operating system-independent methods and systems for locating "extents" (fragments or portions) of files on a storage medium, such as a disk, and for providing this location information to another software or hardware component such as an off-line backup utility, defragmenter, etc. As will be described in detail below, in one aspect of the invention, files are stored on a mirror disk set. When a request or instruction is given to backup files of the mirror disk set, one of the mirror disks is disconnected from the other mirror disk(s) in the mirror disk set to provide a snapshot of the mirror disk set. This process is referred to herein as "splitting the mirror," and the resulting mirror disk is referred to as a snapshot disk. If, when the files are to be backed up, the files are stored on a non-mirrored disk, a mirror disk set is first created by adding a mirror disk and copying the files stored on the non-mirrored disk to the newly added disk to form two mirror disks. Splitting the mirror is considered to be well-known in the art and is not described further herein.

A "resolve agent" or, simply, "agent," contains at least a portion of the file system's routines, which enable the resolve agent to interpret file data structures according to the file system that created the file data structures. This includes interpreting file data structures stored on the snapshot to ascertain the location of the files to be backed up. As noted, the file data structures include information, such as the file location (starting block number and size), the filename of the file, the folder or directory structure in which the file is organized, and the attributes of the file.

The resolve agent also provides an application programming interface (API), enabling other components to communication with the resolve agent. Preferably, a "backup agent" provides the resolve agent, via the API, with name(s) of file(s) to be backed up. The resolve agent reads file data structures on the snapshot disk to locate the file(s) to be backed up, including all extents of those files that are stored as discontiguous pieces on the disk. That is, the resolve agent ascertains a disk address ("beginning physical block number") for the beginning of each extent of each file, as well as the size (number of physical blocks) of each extent. Through the API, the resolve agent provides the physical block addresses and sizes to the backup agent, which initiates a copy operation of the identified extents from the snapshot disk to a backup device. This is in contrast to, for example, operating systems which locate files on a disk and return the data contained in those files rather than returning the location of the extents through an API or otherwise.

The resolve agent interprets file data structures stored on the snapshot disk by implementing those portions of the file system that stored the file which are associated with interpreting file data structures. The resolve agent reads and interprets the file data structures to locate files on the snapshot disk. The resolve agent includes an application programming interface (API) through which a backup agent provides the resolve agent with the names of the files to be backed up. The resolve agent reads file data structures on the snapshot disk to locate the specified files, including all extents of each file that is stored in a set of discontiguous pieces on the disk. Specifically, the resolve agent ascertains a disk address ("beginning physical block number") for the beginning of each extent of each file, as well as the size (number of physical blocks) of each extent. Through the API, the resolve agent provides these physical block addresses and sizes to the backup agent that initiates a copy operation of the identified extents from the snapshot disk to a backup device.

The resolve agent of the present invention can be implemented in any network environment. FIG. 1 is a block diagram of one computer environment in which an embodiment of the present invention can be used to locate extents of files that are to be backed up. Workstations or client computers 102 are connected by a LAN 104 to an application server 106. The application server 106 includes a local disk 108. Application server 106 is connected, via a storage area network (SAN) 110, to a disk array 112, which includes disks 114 and 116. SAN 110 typically includes fiber channel switches, hubs and/or bridges and associated fiber channel interconnection hardware (not shown), although other interconnect technology can be used. An appropriate disk array and associated equipment is available from EMC Corporation, Hopkington, MA under the trade name Symmetrix and Fastrax DataEngine. In this example, disks 114 and 116 are part of a mirror disk set 118 and, therefore, are referred to herein as mirror disks 114 and 116. Mirror disk set 118 can include other disks such as application server local disk 108 and other mirror disks such as mirror disk 120, which is controlled by another disk array (not shown) connected to SAN 110.

The term "disk" is used herein to refer to a physical storage device. However, "disk" can also refer to a partition of a physical disk, such as a partition managed by the disk array 112. "Volume" refers to a single disk or partition or a plurality of disks or partitions, such as a stripe set, span set or a RAID array, that is treated like a single logical disk.

A backup device 122, such as a magnetic tape drive, optical disk writer or other device suitable for producing backup copies of files is connected to a disk array. Preferably, this disk array is the same disk array 112 as one of the mirror disks 114, 116, and preferably over the same bus 124 as the mirror disk 114, 116. Preferably, bus 124 is a small computer system interconnect (SCSI) bus. The medium of the backup device 122 is preferably removable, but it can also be non-removable.

A backup appliance 126 provides a platform on which to run a backup agent 200 and a "resolve agent" 202 (both introduced in FIG. 2 and described in detail below). Advantageously, backup appliance 126 need not run the same operating system as disk array 112 or application server 106. Backup appliance 126 can be a separate computer, such as a personal computer, or the backup agent 200 can run on disk array 112, application server 106, or another computer connected to SAN 110. Backup appliance 126 can be connected to SAN 110 over a dial-up connection or other well-known technology that provides a network connection to disk array 112. A workstation, keyboard and screen, or other hardware capable of providing a graphical user interface ("GUI") 128 (hereinafter referred to as a user interface) is connected to backup appliance 126 to facilitate human interaction with backup agent 200. The connection 130 between user interface 128 and the backup appliance 126 can be direct or over any combination of networks or communication links. A suitable backup agent and user interface is available from Hewlett-Packard Company, Palo Alto, Calif. under the trade name OmniBack.

Figure 2:
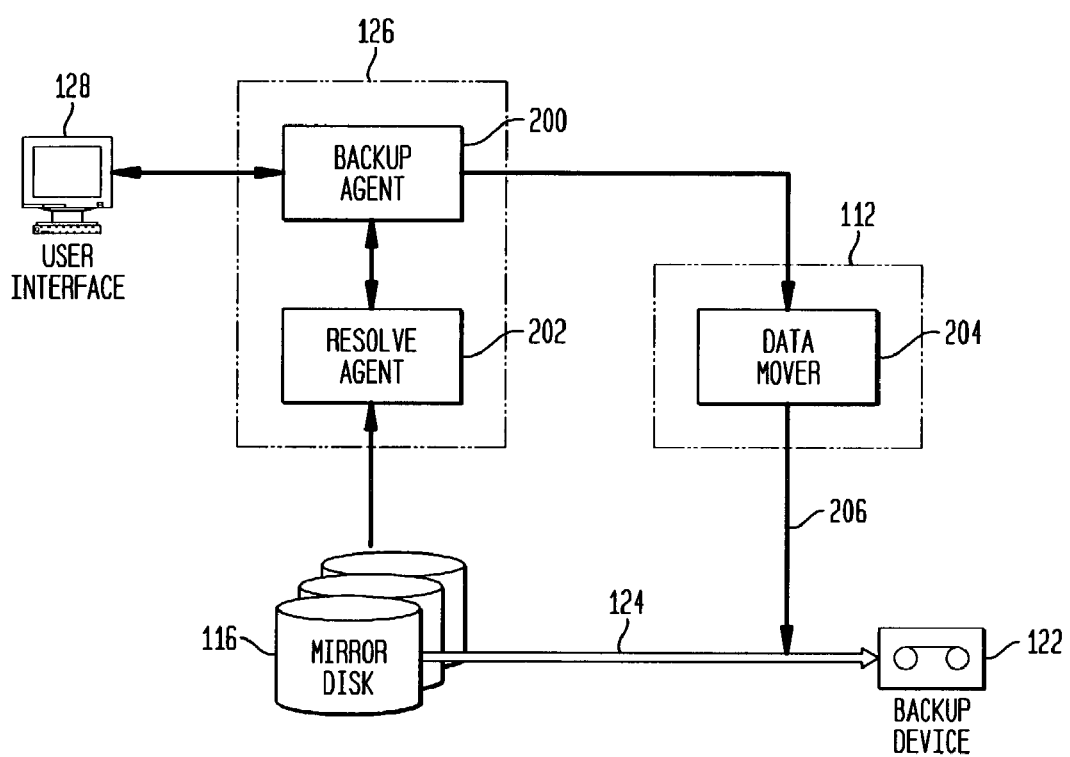
FIG. 2 is a block diagram of one embodiment of the logical components of a backup system of the present invention.

FIG. 2 is a block diagram of one embodiment of the logical components of a backup system of the present invention. Resolve agent 202 and backup agent 200 execute on backup appliance 126 as shown by dashed box 126 in FIG. 2. A data mover 204 executes on disk array 112 although in alternative embodiments, data mover 204 executes on backup appliance 126. Advantageously, one resolve agent 202 can retrieve data from a plurality of disk arrays 112, as described in detail below. A system administrator initiates a backup operation by issuing commands on user interface 128 to identify the files to be backed up, a volume on which the specified files reside, and a backup storage device. The specified volume can be, for example, a mirror disk set. Optionally, the administrator also specifies a backup volume label or other information identifying which magnetic tape or other removable medium to use. This information is provided to data mover 204 for presentation to an operator for selection of the desired medium.

If the file to be backed up resides on a disk that is currently not mirrored, backup agent 200 creates a mirror set by adding a mirror disk to the disk on which the file resides. In any case, backup agent 200 identifies, or optionally the administrator specifies, one mirror disk 116 of the mirror set to be used during a backup operation. The cache (not shown) for the identified or selected disk 114 is flushed, and the disk is disconnected from the mirror set. This produces a disk 114 containing a snapshot of the mirror disk set including the files specified to be backed up. As noted, this procedure is referred to as "splitting the mirror." If the files specified by the administrator reside on more than one disk, the backup agent 200 performs these operations for each applicable disk. This is illustrated in FIG. 2 by the multiple snapshot disks 114.

Backup agent 200 sends file identifying information for each of the files to be backed up to resolve agent 202. This file identifying information can include for each file information identifying the disk(s) on which the file is stored, the directory or folder in which the file is organized and the filename of the file. Resolve agent 202 uses this file identifying information to read file data structures on snapshot disk 114 and to locate all the extents of the specified files.

Disks such as snapshot disk 114 are divided into "physical blocks," typically 512 bytes each, although other block sizes are used. Each physical block has an address referred to as a physical block number. Typically, one contiguous range of physical block numbers spans all the partitions of a physical disk. Thus, a typical arrangement is for the physical block numbers to begin at zero and increment by one to the end of the physical disk. If a physical disk is divided into several partitions, the beginning physical block number of the second and subsequent partitions is equal to one more than the block number of the last physical block in the respective preceding partition. Two or more physical blocks are aggregated into a "logical block". All logical blocks on a volume are of equal size, but logical block sizes can vary from volume to volume. Each logical block has a logical block number. If a volume comprises more than one disk, all the space on the disks of the volume is treated like one contiguous space of logical blocks. In other words, the space of logical blocks abstracts the disks into appearing like one single disk.

An "extent" is a contiguous group of logical blocks. Extents are typically identified by the block number of the first logical block of the extent and the number of logical blocks in the extent. Not all extents on a disk are necessarily the same size. Some files ("contiguous files") are stored in a single extent, but most files are stored in a series of discontiguous extents.

For each file to be backed up, resolve agent 202 ascertains the location of the file. As noted, the file location information comprises the beginning logical block number and number of logical blocks in each extent of the file. The resolve agent 202 converts the beginning logical block number into the corresponding beginning physical block number, and it converts the number of logical blocks into the number of physical blocks, by taking into account the size of a logical block, relative to the size of a physical block. The beginning physical block number of each extent, and the number of physical blocks in each extent, are collectively referred to herein as file "mapping information" and the process of obtaining this mapping information is referred to as "resolution" or "resolving." This file mapping information can also include the identity of one or more disks on which the file resides. Resolve agent 202 sends the mapping information to backup agent 200, which then instructs data mover to 204 to copy the identified blocks from snapshot disk 114 to backup device 122, preferably using an Extended SCSI Copy command ("XCOPY") 206. Optionally, the file mapping information is also written to backup device 122 to facilitate subsequently restoring the backed up file(s). Optionally, after all files that are to be backed up from snapshot disk 114 are copied to backup device 122, snapshot disk 114 can be reconnected to mirror disk set 118.

Figure 3:
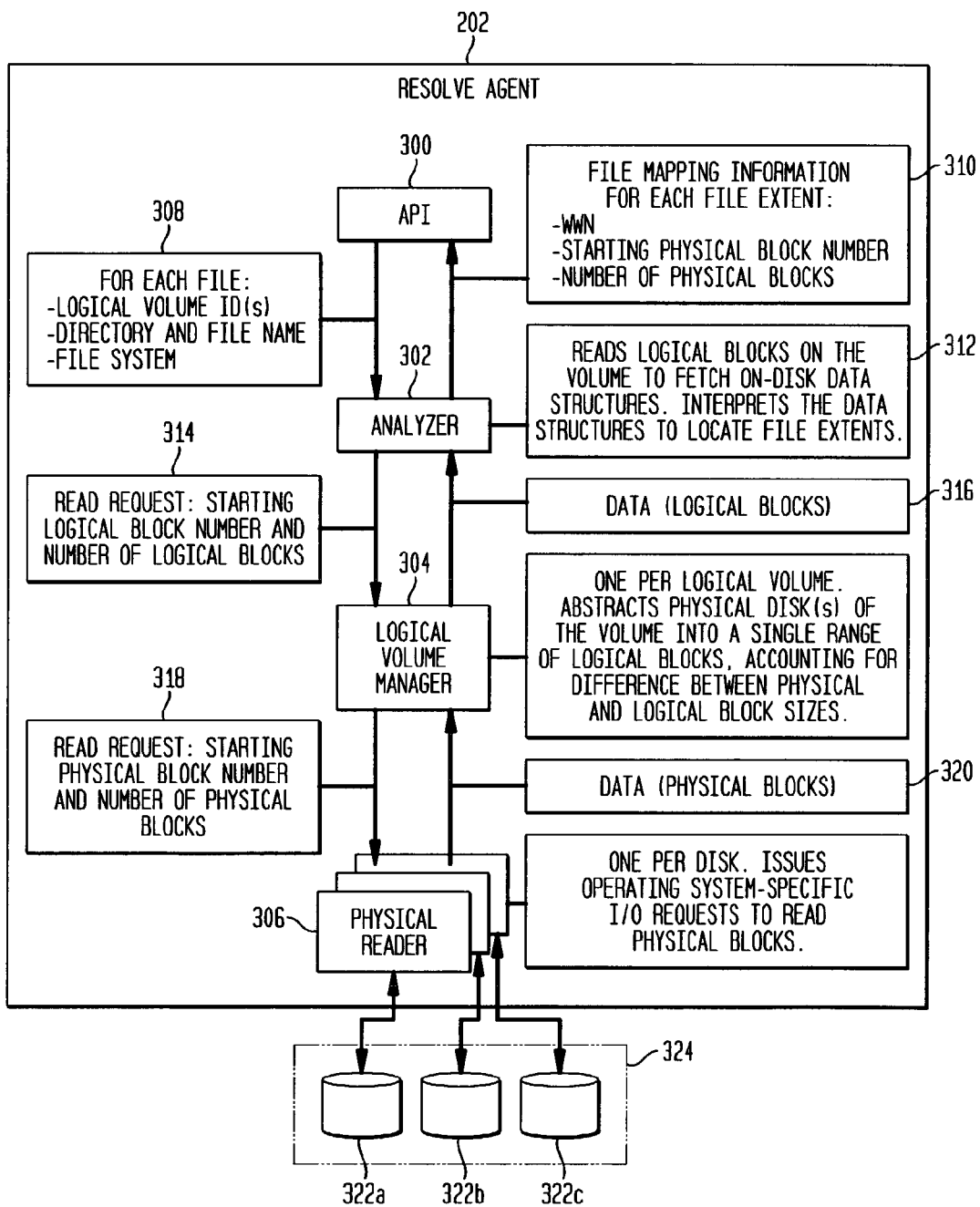
FIG. 3 is a block diagram of the resolve agent illustrated in FIG. 2 in accordance with one embodiment of the present invention.

As shown in FIG. 3, resolve agent 202 contains an interface and three components. Specifically, resolve agent 202 comprises an application programming interface (API) 300, an analyzer 302, a logical volume manager 304 and a physical reader 306, although these functions need not be segregated exactly as shown. In the embodiment illustrated in FIG. 3, there are three snapshot disks 322a, 322b and 322c (collectively and generally referred to as snapshot disks 322) that store the files to be backed up. Together, snapshot disks 322 form a volume 324. A physical reader 306 is created for each disk 322, as shown in FIG. 3.

Analyzer 302, logical volume manager 304 and physical readers 306 provide a hierarchy of abstractions of disks 322. Each component of resolve agent 202 accepts a request from a component or API 300 directly above it made at a higher level of abstraction and, in response, generates one or more requests to a resolve agent component directly below it at a lower level of abstraction; that is, addressed with a finer degree of resolution to a location on a disk than the higher level request. Importantly, API 300, analyzer 302 and logical volume manager 304 are operating system independent, however physical readers 306 is natively compiled to run on the operating system of backup appliance 126.

Advantageously, backup agent 200 and other software components (not shown) can interact with resolve agent 202 through API 300. API 300 provides a way for an external component such as backup agent 200 to specify to resolve agent 202 what disks and files are to be resolved. In the embodiment described below, this information is provided in two data structures, a platform data structure 400 (FIG. 4) and a volume data structure 500 (FIG. 5) described below. In addition, backup agent 200 specifies the location and size of an output buffer in which resolve agent 202 can return file mapping information for the specified files. One embodiment of this output buffer is described below with reference to FIG. 6.

Figure 4:
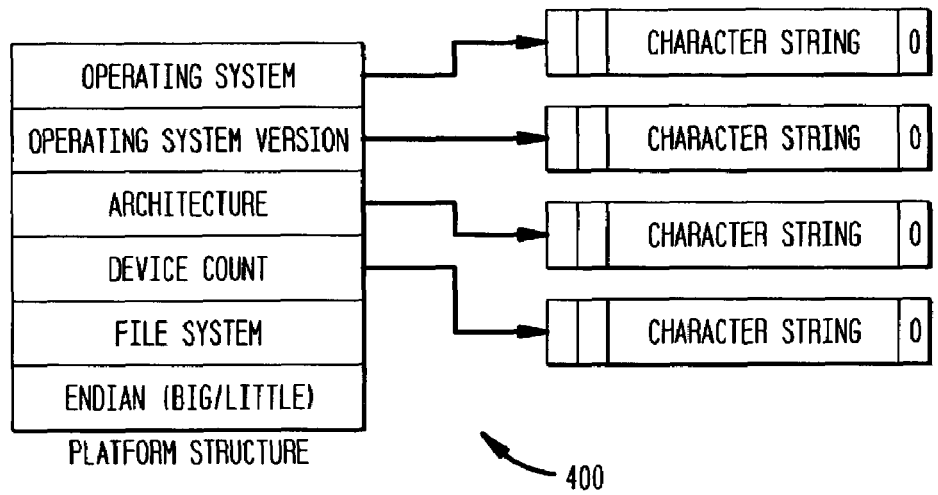
FIG. 4 is a diagram of one embodiment of a platform data structure used by the resolve agent of FIGS. 2 and 3.
Figure 5:
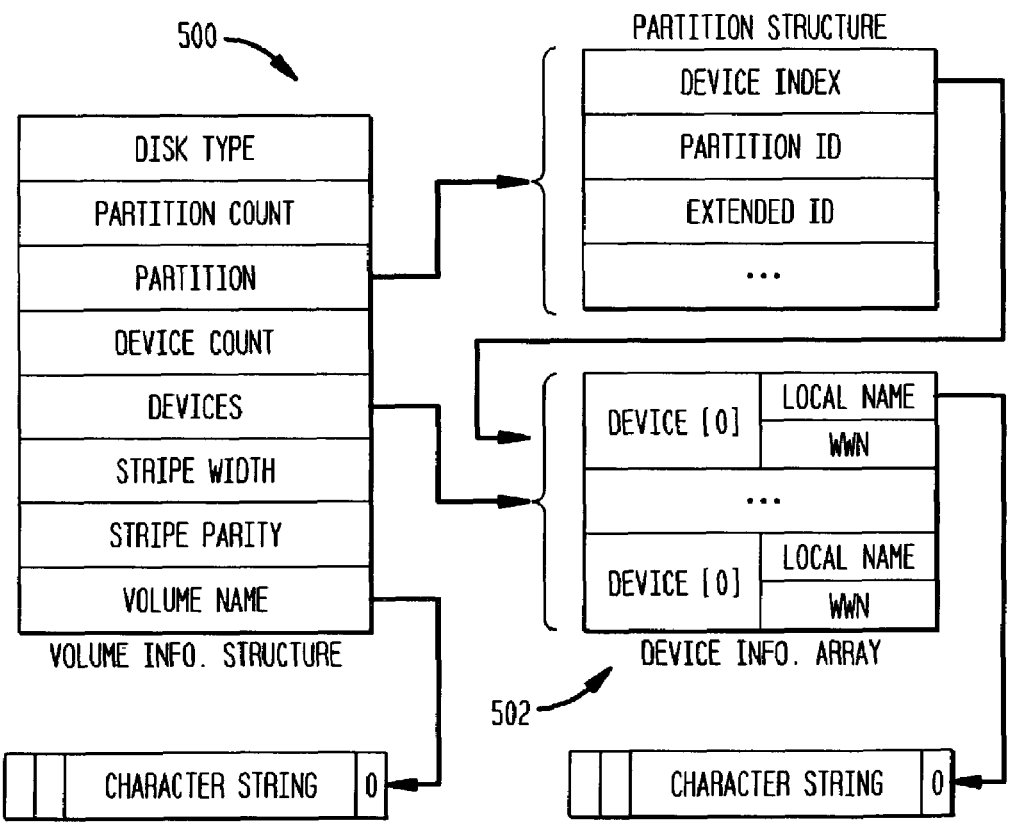
FIG. 5 is a diagram of one embodiment of a volume information data structure used by the resolve agent of FIGS. 2 and 3.

In one embodiment, API 300 includes five calls: ResolveOpen( ), ResolveGetFirstBuffer( ), ResolveGetNextBuffer( ), ResolveClose( ) and ResolveGetErrorCode( ). The ResolveOpen API call conditions the resolve agent 202 for a particular volume and platform combination. This API call has two parameters, "*platform," and "*volume". The parameter "*platform" defines the platform or operating system of the disk to be processed. This parameter points to a platform data structure 400, one embodiment of which is shown in FIG. 4. Platform data structure 400 includes information pertaining to snapshot disks 322 such as the type and version of the operating system, etc. The parameter "*volume" specifies which volume is to be processed. This parameter points to a volume information data structure 500, one embodiment of which is shown in FIG. 5. These parameter are passed to the API 300 from an external component (not shown). Backup appliance 126 establishes a connection to snapshot disk 322, so snapshot disk 322 appears to be locally connected to backup appliance 126. "Local name" is a character string, for example "/dev/rdsk/c0t1d0", by which disk 322 is referenced by backup appliance 126. "WWN" stands for "world wide name," a 64-bit integer that identifies the disk 114 (FIG. 1) in the SAN 110. Since a volume identified by a volume structure 500 can comprise several disks, a device information array 502 can contain information for each of these disks.

The ResolveGetFirst Buffer call causes resolve agent 202 to begin resolving a list of specified files. The ResolveGetFirstBuffer API function call includes five parameters: fileCount, **filenames, *continueFlag, bufferSize and *buffer. The parameter "fileCount" indicates the number of files in the "filenames" array. The parameter "**filenames" is an array of filenames to be resolved. API 300 passes this parameter to analyzer 302. This is indicated on FIG. 3 at 308.

The parameter "*continueFlag" is a return parameter that indicates all the file mapping information could not be returned in one buffer, and the backup agent should call ResolveGetNextBuffer to retrieve one or more additional buffers of file mapping information. The parameter "bufferSize" denotes the size of the output buffer containing the requested file mapping information. The parameter "*buffer" is a return parameter that points to the noted output buffer containing file mapping information. This parameter is passed from analyzer 302 to API 300 as shown by reference numeral 310 in FIG. 3.

Figures 6, 7:
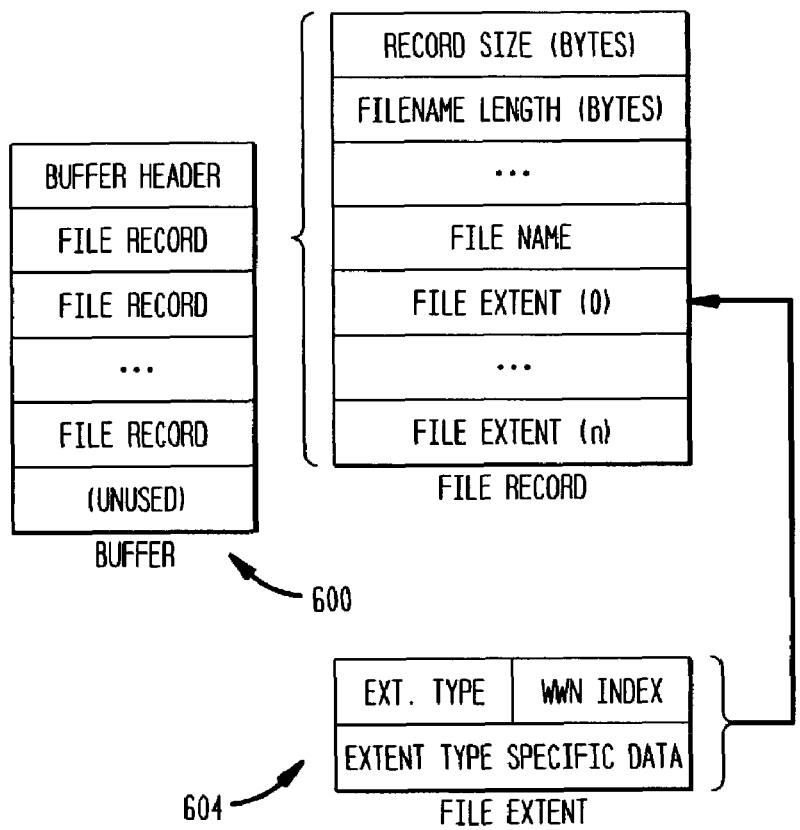
FIG. 6 is a diagram of a buffer used by the resolve agent of FIGS. 2 and 3 in accordance with one embodiment of the present invention
FIG. 7 is a table of extent types used by the resolve agent of FIGS. 2 and 3 in accordance with one embodiment of the present invention.

FIG. 6 is a block diagram of one embodiment of the structure of an output buffer 600. The file mapping information for each file is contained in a file record 602, and each extent is described in a "file extent" data structure 604. FIG. 7 depicts a table 700 of extent types and the specific data that is included in the file extent record 604 for the specific type of extent. This specific data is referred to as extent types specific data in FIGS. 6 and 7. For example, "Sparse" files have holes, that is, unallocated disk space, in them. These holes have never been written, and typically read back as zeroes. "Embedded files" are very small files (typically less than 2K bytes) and are stored in a header block of the file structure, rather than having space allocated to them, as normal files do. The resolve agent 202 returns the contents of embedded files, rather than their mapping information, in the buffer 600.

ResolveGetNextBuffer(*continueFlag, bufferSize, *buffer) returns additional buffers when all the mapping information could not be returned in one buffer. The parameter "*continueFlag" is a return parameter which denotes that another call to ResolveGetNextBuffer is necessary. The parameters "bufferSize" and "*buffer" are the same as in ResolveGetFirstBuffer.

ResolveClose( ) cleans up the internal data structures and stops threads of resolve agent 202. This is described in greater detail below.

ResolveGetErrorCode( ) returns an error code for the last call to the resolve agent 202.

Analyzer 302 accepts file identifying information such as the filenames of the files to be backed up, the directories or folders in which these files are organized, and the name of the disk or disks on which the files are stored. In one embodiment, each disk is identified by a "logical volume" name. Analyzer 302 receives this information through the ResolveOpen( ) API call described above. More particularly, this information is provided to analyzer 202 through platform data structure 400 and volume data structure 500 which are passed to analyzer 302 through this call.

For each extent of each file to be resolved, analyzer 302 reads and interprets file data structures on snapshot disk 322 to locate the beginning logical block number and size (number of logical blocks) of extent 312. The Analyzer 302 treats snapshot disks 322 as a space of logical blocks, even if disks 322 form a multidisk volume 324. To read the file data structures, analyzer 302 issues read requests 314 to the logical volume manager 304. Each such read request specifies a starting logical block number and a number of logical blocks to read. Since analyzer 302 is written with knowledge of the layout of the file data structures on snapshot disk 322, instructions ("file system logic") in analyzer 302 can select appropriate logical blocks on snapshot disk 322 to read the necessary file data structures. Logical volume manager 304 returns the logical blocks 316 requested by the analyzer 302, and the analyzer analyzes the file data structures returned in these logical blocks. The file data structures on the disk 322 store extent addresses and sizes in terms of logical blocks. The analyzer 302 converts these starting logical block number addresses to starting physical block number addresses, and it converts sizes from numbers of logical blocks to numbers of physical sizes, based on the ratio of physical block size to logical block size of the disk 322.

Essentially, analyzer 302 includes a "read-only" file system for the file data structures used on snapshot disk 322. That is, analyzer 302 contains file system logic necessary to locate all the extents of a file on snapshot disk 322. Importantly, analyzer 302 does not need to contain file system logic necessary to allocate blocks or create or extend files on a disk. This read-only file system includes file system logic necessary to read the master file table, I-node or other file system-specific or operating system-specific file data structures on disk 322 to ascertain the disk's logical block size and other parameters of snapshot disk 322 and to interpret the directory structure and file mapping information stored on snapshot disk 322 and, thereby, locate extents of the specified files on the disk.

Most computer architectures store multi-byte data, such as 32-bit "long" integers. In some such architectures, the least significant eight bits of data is stored at the lowest addressed byte of the multi-byte data. This is in contrast to other computer architectures in which the least significant eight bits of data is stored in the highest addressed byte. This is commonly referred to as "little endian" and "big endian". If analyzer 302 is executing on a computer that has a different endian than the computer that wrote the file data structures on disk 322, analyzer 302 converts data, such as starting logical block numbers, it extracts from the logical blocks returned by the logical volume manager 304. The endian of the disk 322 is indicated in platform data structure 400.

Logical volume manager 304 accepts I/O requests addressed to logical blocks 314 and generates corresponding I/O requests addressed to physical blocks on the appropriate disk 318. Logical volume manager 304 abstracts disks 322 into a contiguous span of logical blocks starting at logical block number zero, even if the disk is a multidisk volume or the disk includes an partition that begins at a physical block other than physical block number zero. Logical volume manager 304 ascertains the physical block size of the disk 322 by querying the disk. For example, for a SCSI disk, a SCSI IOCTL command can be issued to find the disk's block size, etc. Analyzer 302 passes to logical volume manager 304 information about a disk 322 obtained through the ResolveOpen( ) call. This information includes the disk's logical block size. Based on the logical block size and the physical block size, logical volume manager 304 calculates the number of physical blocks to read from disk 322 to satisfy any given request to read logical blocks. Based on the disk's beginning physical block number and the beginning logical block number of an I/O request, the logical volume manager 304 calculates an offset to the beginning physical block number to read. If the disk is a multidisk volume, such as a stripe set, the logical volume manager 304 calculates which disk(s) of the multidisk set contain the physical blocks corresponding to the requested logical blocks. Logical volume manager 304 then passes, to the physical reader (s) 306 corresponding to the appropriate disk(s), requests 318 to read the appropriate physical blocks. Physical readers 306 return at 320 physical blocks to logical volume manager 304, which aggregates the physical blocks into logical blocks and returns the logical blocks 316 to the analyzer 302.

Using UNIX "superuser" privilege, or a corresponding privilege on the backup appliance 126, the physical reader 306 is able to read any physical block(s) on the disk 322. Physical readers 306 issues I/O calls to the operating system of the backup appliance 126 to read these physical blocks. Physical reader 306 is, therefore, natively compiled to run under the operating system of backup appliance 126.

When resolve agent 202 receives a ResolveGetFirstBuffer( ) call, it spawns a thread of execution to handle the request. For each file identified in the ResolveGetFirstBuffer( ) call, resolve agent 202 reads file data structures on snapshot disk 322 to ascertain the file's mapping information, and places that mapping information in a buffer 600. If the buffer becomes full, the thread is paused. Once the caller receives buffer 600, the thread is resumed and continues placing mapping information into buffer 600. Multiple threads enable resolve agent 202 to concurrently handle requests from multiple callers and facilitates multiple simultaneous backup operations from multiple disks 322 to multiple backup devices 122 (FIG. 1).

Preferably, the source code of analyzer 302 contains file system logic that enables it to read disks produced by several file systems. In such embodiments, a compile-time parameter can be implemented to control which file system logic is to be compiled at a given time. In one embodiment, file system logic that is not selected is not compiled. Alternatively, analyzer 302 is compiled with file system logic that enables it to read multiple file systems. In this latter embodiment, analyzer 302 selects, on a case-by-case basis, which file system logic to utilize. This determination can be based on, for example, the file system of snapshot disk 322, or it can be specified in an API call. Analyzer 302 can use platform structure 400 to identify the operating system and file system that was used to produce a disk 322. Alternatively, the analyzer 302 independently ascertains the file system that produced the disk 322 by reading portions of the disk. Typically, the first few blocks of the disk contain data, such as character strings, that identify the file system.

Writing an the analyzer 302 that can interpret file mapping information and locate extents is within the skill of an ordinary practitioner, if documentation of the location and layout of the file data structures on the disk 322 is available or can be ascertained by "reverse-engineering". Some file systems and their corresponding file data structures, such as Windows NT Version 4.0 (NTFS), FAT16, FAT32, HPUX, UFS, HFS and Digital/Compaq Files-11, are well documented, so writing an analyzer 302 for these file systems is straightforward. Other file system, such as Veritas V3, Veritas V4 and Veritas V4, are partially documented. Yet other file systems must be reverse engineered to understand their file data structures.

Reverse engineering a file system involves ascertaining the location and layout of file data structures stored on a disk and used to keep track of files on the disk and the location of the extents of these files. Several tools are available to facilitate this reverse engineering, and some file systems are partially documented. For example, Veritas has "manual pages" that partially document the file system.

Reverse engineering a file system involves several steps. A quiescent copy of a disk containing a number of representative files and directories (folders) should be obtained. Native commands, management utilities and programs provided with the operating system or written by a programmer can be used to obtain a user-visible view of information about the files and folders on the disk. For example, the "find", "ls" and "dir" commands, with various options, can be issued to obtain a list of files and sizes. Some of these commands can also provide file mapping information, which is helpful in verifying the location and layout of the file data structures. Documentation provided with the operating system, particularly the operating system's API, describes I/O calls that can be made to retrieve information about files or disks that might not be available through the native commands mentioned above. Dump utilities and file system debuggers, such as WinHex, DISKEDIT and fsdb (which ships with HP-UX 11.0), can be used to produce human readable representations of the data stored on the disk. If no such dump utility is available, one can easily be written, although it might be necessary to mount the quiescent disk as a "foreign" volume, and superuser privilege might be required, allowing the dump program to read all logical blocks of the disk, without intervention by the operating system's file system.

Alternatively, the resolve agent 202 can be accessed by a backup agent, disk defragmenter or other component ("client") using a web interface. Returning to FIG. 1, backup appliance 126 can include a web server, such as the Apache web server, available from the Apache Software Foundation. Alternatively, the resolve agent can run on a separate "resolve appliance" 132, which also includes a web server. In either case, a web client 134 can access the computer on which the resolve agent 202 runs over a wide area network (WAN) 136, such as the Internet, or another network, such as a LAN, which can be LAN 104. Well-known remote procedure calls (RPCs), such as those supported by the Simple Object Access Protocol (SOAP), can be used by the web client to invoke procedures in the resolve agent 202 and return data to the web client. SOAP supports RPCs by enclosing the remote procedure calls and data in XML tags and transporting them between the web client 134 and the computer on which the resolve agent 202 runs, i.e. the resolve appliance 132 or the backup appliance 126, using the hypertext transport protocol (HTTP). In this way, the resolve agent 202 can provide a remote procedure calling interface, specifically a web interface, to the client 134.

Although the resolve agent 202 has been described as returning file mapping information for individual files, alternatively it can return mapping information for an entire volume. The backup agent 200 or other external entity can send volume identifying information, but no file identifying information, through the API 300 to the resolve agent 202. In this case, the resolve agent can return mapping information for the entire volume, rather than for individual files stored on the volume. This mapping information includes the starting physical block number of the volume and the number of physical blocks in the volume. If the volume comprises a multidisk set, this mapping information can comprise the starting physical block number of each disk and the number of physical blocks in the disk. Utilizing this alternative, the backup agent 200 can make a backup copy of the entire volume, rather than each file, on the backup device 122.

Although the resolve agent 202 has been described as providing file or volume mapping information to a backup agent 200, the resolve agent can provide this mapping information to other clients, such as a disk defragmentation utility. Furthermore, the resolve agent 202 can be invoked to ascertain information about one or more volumes connected to a SAN 110, without providing volume or file information to the resolve agent. In this case, the resolve agent 202 ascertains which volumes are accessible over the SAN 110 and ascertains information, such as volume name, file system, operating system, files, sizes, owners, creation/access/backup dates, etc. for these volumes and files stored on these volumes. In this case, the resolve agent 202 reads and interprets file data structures stored on these volumes as described above, but instead of searching for information on specified files, the resolve agent 202 returns information on all files or only on files that meet filter criteria specified by the other clients.

Although resolve agent 202 is described as reading file data structures to resolve each file, the resolve agent can cache these structures in memory to reduce the number of I/O operations performed.

Although operation of the present invention has been described in terms of locating physical blocks of one or more files, information can be stored on a disk without necessarily organizing it into a file. The more general term "data" is, therefore, also used to refer to information stored on a disk or volume.

Resolve agent 202 is preferably implemented in software that can be stored in the memory, and control the operation, of a computer. Furthermore, the resolve agent 202 can be stored on a removable or fixed computer-readable medium, such as a CD-ROM, DVD, hard disk and floppy disk. In addition, this software can be transmitted over a wireless or wired communication line or network.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

We claim:

1. An agent for providing requested information identifying physical storage locations in which a file on a storage device is stored, comprising:

an application programming interface through which file identifying information corresponding to the file is provided to the agent and the requested information identifying the physical storage locations for the file corresponding to the file identifying information is provided by the agent; and an analyzer configured to receive file identifying information from the application programming interface and read one or more file data structures on the storage device to ascertain a starting logical block number and a number of logical blocks corresponding to the received file identifying information;

a logical volume analyzer configured to receive a read request from the analyzer, wherein the read request specifies at least the starting logical block number and the number of logical blocks to read; and wherein the logical volume analyzer is further configured to transfer one or more logical blocks to the analyzer in response to the read request;

wherein the analyzer is further configured to analyze the logical blocks received from the logical volume analyzer to ascertain the requested information identifying the physical storage locations on the storage device according to a file system that created the file data structures on the storage device.

2. The agent of claim 1, wherein the file system is one of a plurality of file systems.

3. The agent of claim 1, wherein the file system logic is read-only.

4. The agent of claim 2, wherein the information identifying the physical storage locations identifies the one of the plurality of file systems.

5. The agent of claim 1,
wherein the file identifying information comprises information identifying a volume and a filename of a file stored on a volume; and
wherein the file data structure is stored on the volume.

6. The agent of claim 1, wherein the file identifying information identifies a plurality of files.

7. The agent of claim 1, wherein the file identifying information identifies a plurality of volumes.

8. The agent of claim 1, wherein the agent is multi-threaded to concurrently service a plurality of callers.

9. The agent of claim 2, wherein the one of the plurality of file systems is automatically ascertained by the analyzer.

10. The agent of claim 1, wherein the agent executes under the control of a first operating system and the file system executes under the control of a second operating system that is different than the first operating system.

11. An agent for providing requested information identifying physical storage locations in which a file on a storage device is stored, comprising:

an application programming interface comprising,
an open call comprising a compilation parameter pointing to a platform data structure providing information regarding a file system for the storage device and an operating system for the storage device;
a get call comprising one or more parameters providing file identifying information corresponding to the file and a parameter pointing to an output buffer for storing the requested information identifying the physical storage locations for the file corresponding to the file identifying information; and
file system logic capable of ascertaining information identifying the physical storage locations according to the file system provided by the platform data structure and capable of ascertaining the requested information identifying the physical storage locations from an on-disk structure according to the selected file system and storing the requested information identifying the physical storage location for the file in the output buffer.

12. The agent of claim 11, wherein the file system logic is capable of ascertaining the requested information identifying the physical storage locations according to only the selected file system.

13. The agent of claim 11, wherein the compilation parameter identifies one file system from a list consisting of NTFS V4.0, Veritas V2, Veritas V3, Veritas V4, UFS and HFS.

14. The agent of claim 11, wherein the file system logic is read-only.

15. The agent of claim 11, wherein:
the file identifying information comprises information identifying a volume and a filename of a file stored on a volume; and
the on-disk structure is stored on the volume.

16. The agent of claim 15, wherein the file identifying information identifies a plurality of files.

17. The agent defined in claim 15, wherein the file identifying information identifies a plurality of volumes.

18. The agent of claim 11, wherein the agent is multi-threaded to concurrently service a plurality of callers.

19. A method for providing requested information identifying physical storage locations in which a file on a storage device is stored, comprising:

receiving a request for information identifying the physical storage locations for the file, said request including file identifying information corresponding to the file;

reading, by an analyzer, one or more file data structures on the storage device to ascertain a starting logical block number and a number of logical blocks corresponding to the received file identifying information;

reading one or more logical blocks corresponding to the starting logical block number and the number of logical blocks;

analyzing, by the analyzer, the read logical blocks to obtain the requested information identifying the physical storage locations on the storage device according to a file system that created the file data structure on the storage device; and providing the requested information identifying the physical storage locations in reply to the request.

20. The method of claim 19, wherein the file identifying information comprises information identifying a volume on which the file is stored, and a filename of the file.

21. The method of claim 19, wherein the file identifying information identifies a plurality of files.

22. An article of manufacture, comprising:
a computer-readable medium storing computer-executable instructions, the instructions implementing:

an application programming interface, by which file identifying information corresponding to a file can be received and information identifying physical storage locations in which the file is stored on a storage device can be sent;

an analyzer configured to receive file identifying information from the application programming interface and read one or more file data structures on the storage device to ascertain a starting logical block number and a number of logical blocks corresponding to the received file identifying information;

a logical volume analyzer configured to receive a read request from the analyzer, wherein the read request specifies at least the starting logical block number and the number of logical blocks to read; and wherein the logical volume analyzer is further configured to transfer one or more logical blocks to the analyzer in response to the read request;

wherein the analyzer is further configured to analyze the logical blocks received from the logical volume analyzer to ascertain the requested information identifying the physical storage locations on the storage device.

23. The article of manufacture of claim 22, wherein:
the file identifying information comprises information identifying a volume and a filename of a file stored on the volume; and
the on-disk structure is stored on the volume.

24. The article of manufacture of claim 23, wherein the file identifying information identifies a plurality of files.

25. The article of manufacture of claim 23, wherein the file identifying information identifies a plurality of volumes.

26. The article of manufacture of claim 22, wherein the computer-executable instructions are multi-threaded to concurrently service a plurality of callers.

27. The article of manufacture of claim 22, wherein the on-disk structure is stored in accordance with a file system that is a read-only file system.

28. An agent for providing requested information identifying physical storage locations in which a file on a storage device is stored, comprising:
means for receiving a request for information identifying the physical storage locations for the file, said request including file identifying information corresponding to the file and for providing the requested information identifying the physical storage locations in reply to the request;
means for reading one or more file data structures on the storage device to ascertain a starting logical block number and a number of logical blocks corresponding to the received file identifying information;
means for reading one or more logical blocks corresponding to the starting logical block number and the number of logical blocks; and
wherein the means for reading one or more file data structure comprises means for analyzing the read logical blocks to obtain the requested information identifying the physical storage locations according to a file system that created the file data structure on the storage device.

* * * * *

UNITED STATES PATENT AND TRADEMARK OFFICE
CERTIFICATE OF CORRECTION

| | |
|---|---|
| PATENT NO. | : 7,308,463 B2 |
| APPLICATION NO. | : 10/180284 |
| DATED | : December 11, 2007 |
| INVENTOR(S) | : Bradley Taulbee et al. |

It is certified that error appears in the above-identified patent and that said Letters Patent is hereby corrected as shown below:

On the Title page, in field (75), under "Inventors", in column 1, line 5, delete "Kevin Collims" and insert -- Kevin Collins --, therefor.

Signed and Sealed this

Twenty-seventh Day of May, 2008

JON W. DUDAS
*Director of the United States Patent and Trademark Office*